UNITED STATES PATENT OFFICE.

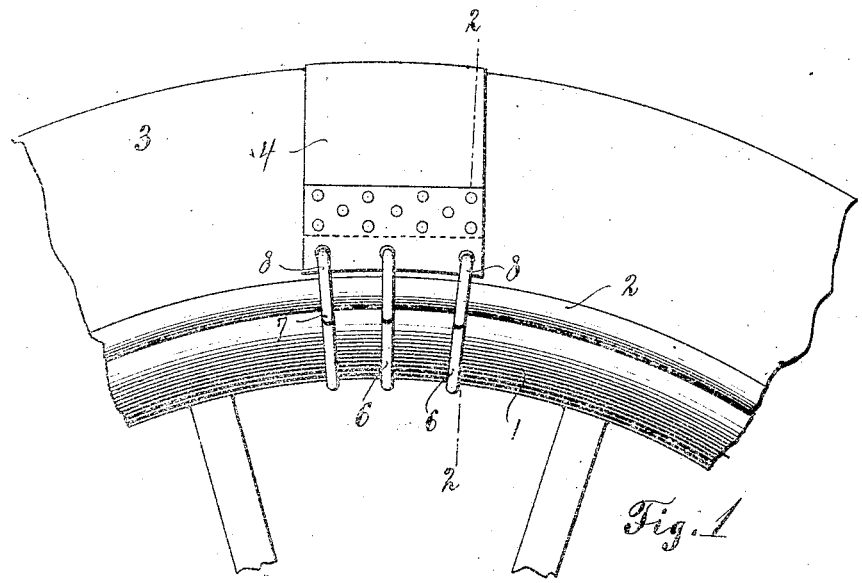
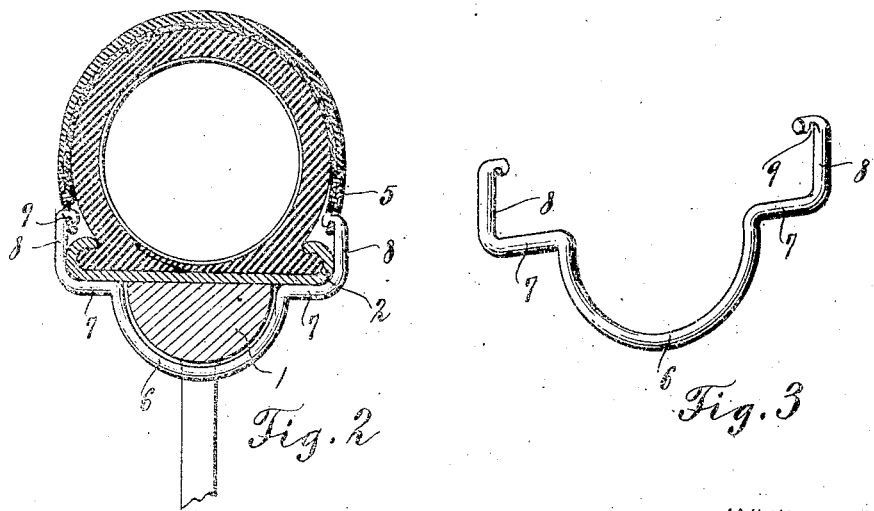

ANDREW G. EDLUND AND ANDREW LEAFGREN, OF AXTELL, NEBRASKA.

TIRE-PROTECTOR.

1,039,665.

Specification of Letters Patent.   Patented Sept. 24, 1912.

Application filed July 6, 1911.  Serial No. 637,057.

*To all whom it may concern:*

Be it known that we, ANDREW G. EDLUND and ANDREW LEAFGREN, citizens of the United States, residing at Axtell, in the county of Kearney and State of Nebraska, have invented certain new and useful Improvements in Tire-Protectors, of which the following is a specification.

This invention relates to tire protectors and an object is to provide a device of this class which may be applied to any wheel for protection of pneumatic tires and, which is especially adapted to be placed over a blow out on the same.

Another object is to provide peculiar attaching means for a tubular tire protector to be used in connection with an ordinary construction of automobile wheels in which is provided a metal rim outside the felly which is somewhat wider than the latter, thereby forming inwardly disposed shoulders on which the attaching means for the tire protector have their bearings, being spaced from the felly so that the finish on the same will not be mutilated.

With the above and other objects in view, this invention consists in the construction, combination, and arrangement of parts, all as hereinafter more fully described, claimed, and illustrated in the accompanying drawings, wherein Figure 1 is a side elevation of a portion of the automobile wheel having the invention applied thereto; Fig. 2 is a transverse section on the line 2—2 of Fig. 1; and Fig. 3 is a detail perspective of one of the attaching members.

Throughout the following detail description and on the several parts of the drawings, similar parts are referred to by like reference characters.

Referring to the drawings, at 1 is indicated the felly of an automobile wheel having the metal rim 2 applied thereto which is formed with the usual attaching means for the tire 3. As disclosed in the drawings, the rim 2 is wider than the felly of the automobile wheel, so that the opposite sides extend beyond the side of the felly thereby forming a flat shoulder. In the present invention advantage is taken of said shoulders to obtain a bearing thereon for the peculiar means for attaching the tire protector in place, as will hereinafter be more fully described.

The protector consists of a flexible tubular sleeve having a reinforcement indicated at 4 which has attached to either side thereof a metal plate 5 of substantially the same length as the sleeve. On the outside of the reinforcement which, in this case, consists of canvas is a layer of rubber extending from side to side of the protector and stops against the edge of the metal plate, thereby forming an even surface of the same height as the said plate. Adjacent to the side or margin of the metal plate, the same is provided with openings adapted to engage with hooks carried by the attaching or securing means for the protector. The peculiar formation of said securing means is especially advantageous in connection with the construction of automobile wheels illustrated in the drawings. The general formation of said securing means is in the form of a yoke having a central portion 6 and side portions 7, which latter are in alinement and bent to form parallel shanks 8 substantially at right angles to the portions 7. Said shanks 8 are bent at their extremities inwardly to form hooks which in the application are adapted to be engaged with the above described attaching openings of the plates 5. To more securely keep them in engagement with said plates, the hooks have a recess 9 cut at the under side thereof.

It will be noted that the attaching member may be made in any way but is preferably bent from a single piece of metal rod and the design is such that the tire protector may be easily and very securely attached to the wheel when out on a journey, should the tire be mutilated by some obstacle on the road or by expansion of the air tube of the tire.

A peculiar object of this invention resides in that the formation of the attaching member is such that the same derives its bearing from the opposite sides of the rim only and remains in spaced relation to the felly so that the finish of the latter will not be mutilated, or if the same is made, as usually is the case, of wood, it would not be worn by the attaching means.

The construction of the entire device is exceedingly simple and when securing the same on a tire, it is only necessary to engage the opposite hook members 9 with the attaching openings of the plates 5.

Having thus fully described our invention, what is claimed as new is:—

As an article of manufacture, a device for securing tire protector sleeves to wheels comprising a single, continuous yoke member, formed at opposite sides with shoulder portions to bear against a wheel rim and hold said member spaced from the felly, said yoke member having its ends bent to form hooks to engage the protector sleeve.

In testimony whereof we affix our signatures in presence of two witnesses.

ANDREW G. EDLUND.
ANDREW LEAFGREN.

Witnesses:
  JAMES JOHNSON,
  ADOLPH A. NYSTROM.